July 15, 1941.  L. N. ROBINSON  2,249,042
VALVE
Filed Dec. 19, 1938
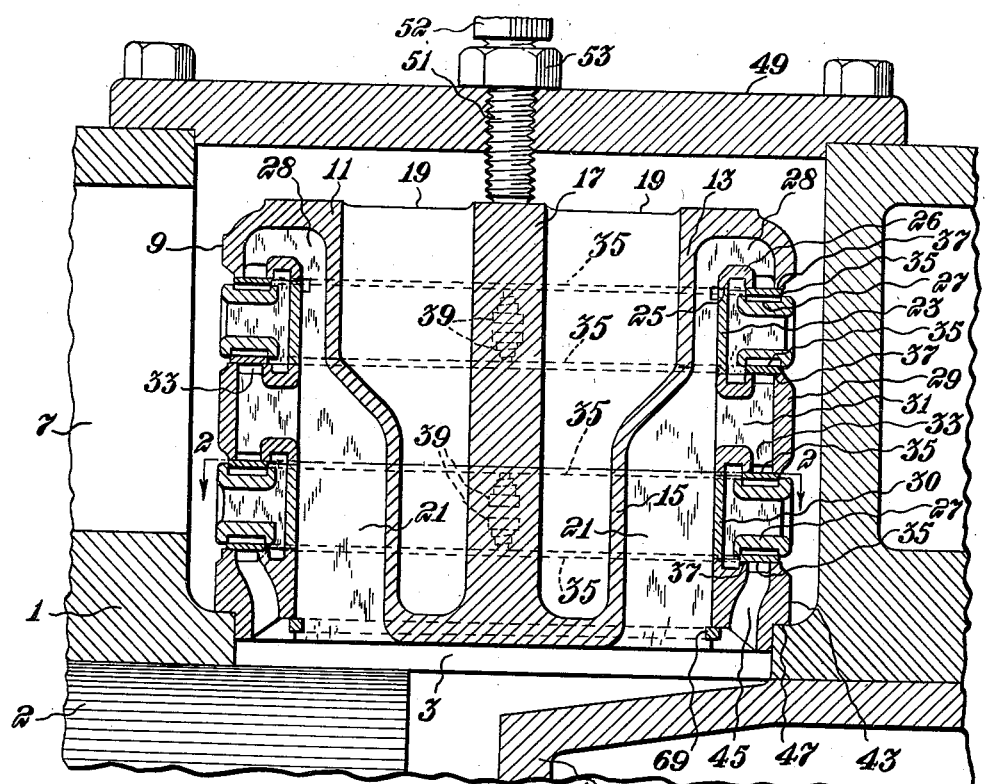
FIG-1
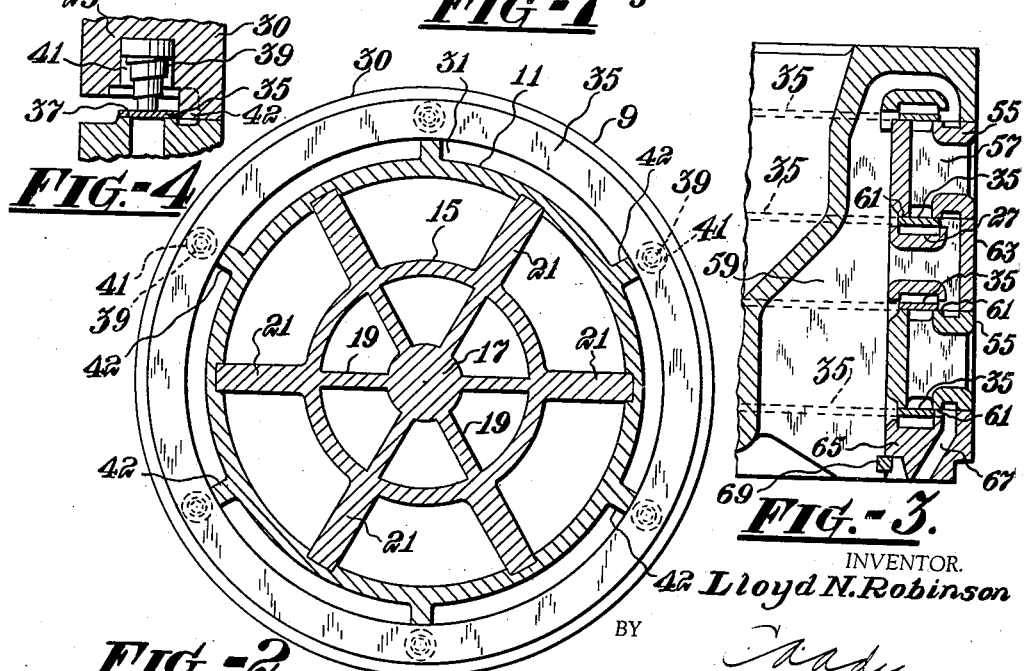
FIG-4
FIG-2
FIG-3
INVENTOR.
Lloyd N. Robinson
BY
HIS ATTORNEY Patented July 15, 1941

2,249,042

UNITED STATES PATENT OFFICE 2,249,042

VALVE

Lloyd N. Robinson, Corning, N. Y., assignor to Ingersoll-Rand Company, Jersey City, N. J., a corporation of New Jersey Application December 19, 1938, Serial No. 246,629

4 Claims. (Cl. 277—60)

This invention relates to valves for a fluid compressor and, more particularly, relates to a stacked type of valve assembly adapted for use in controlling the flow of fluid through either the intake port or discharge port of a fluid compressor.

Objects of this invention are to provide a valve assembly having a plurality of valve ports located at varying distances from the compressor cylinder proper so arranged that each port is enabled to pass equal amounts of fluid with respect to each other; having interchangeable parts; and in which the number of valve ports may be varied at will to adapt the valve assembly for use with various sizes of compressors.

It is a further object to provide a simple compact valve wherein a large port area is provided in a small space.

These objects and advantages will be apparent from the following description and drawing in which Figure 1 is a cross-sectional view of the valve of the present invention mounted on the discharge port of a fluid compressor, Figure 2 is a sectional view taken along the line 2—2 in Fig. 1.

Figure 3 is a partial view in section of the arrangement of an intake valve made in accordance with the principles of this invention, Figure 4 is a view of the means for resiliently holding the valves on the seats and the lateral guide for the valves in accordance with Fig. 1.

With reference to Fig. 1, the cylinder wall 1 of the compressor which guides the piston 2 is provided with a discharge port 3. In order to seal the end of the cylinder the member 5 is provided. A conduit 7 ordinarily receives the fluid discharged through the port 3 and, as is customary, a valve assembly generally indicated at 9 is interposed between the port 3 and the conduit 7 in order to prevent any fluid discharged into the conduit from returning to the compressor.

The valve assembly 9 comprises a valve body 11 which is here shown as cylindrical in shape but may be conical or flat sided. One wall portion 13 of the body 11 is of greater diameter than the wall portion 15 the purpose of which will be described hereinafter. These wall portions 13 and 15 are formed integrally with a central post 17 and a fluid passage or space is provided between the post and the wall portions 13 and 15. In order to support the wall portions 13 and 15, ribs 19 extend radially from the central post 17. These ribs are continued outside of the wall portions 13 and 15, as ribs 21, which are of greater width than ribs 19. The ribs 21 are provided to act as guide and support means for the plates or ring members which surround the wall portions 13 and 15.

As will be noted in Fig. 1 the ring member 23 rests against a seat 25. It is guided to this position and held against rotational movement by the ribs 21 as indicated in Fig. 2. In order to provide the seat 25, a cross member 26 is extended between each of the ribs 21 and this member is also utilized with the part of the wall of the valve body which is curved over at the top to define a passage 28.

The ring member 23 serves to provide valve guide means 27. A second ring member 29 is placed next to the initial ring member 23. This ring 29 is provided with a passage 31 and passages 33 at right angles to the passage 31. The passage 31 opens into the fluid passage or space between rings 23 and 29 and the walls 13 and 15 of the valve body and, consequently, fluid discharged from the port 3 is able to enter the passages 33.

If no means were provided to stop the flow of fluid through passages 33, fluid would flow directly from the port 3 to the conduit 7. Since ring member 29 is provided with the passages 33, two ports are formed for which valves 35 must be furnished. These valves rest on the seats 37 formed around the passages 33 and movement of the valves 35 from the seats is limited by the guide means 27 of ring members 23 and the ring member 30, similar to ring member 23 and placed below ring member 29. In order to maintain the valves 35 on their seats, springs 39 (Fig. 4) resting in recesses 41 formed in the ring members 23 and 30 are provided at spaced intervals around the circumference of these members. Guides 42 are also provided at each recess 41 to prevent lateral displacement of the valves 35.

It will thus be seen that, when the fluid discharged by the compressor has a pressure sufficient to overcome the pressure of the fluid in conduit 7 and the resiliency of the springs 39, the valves 35 will open and permit fluid to escape to the conduit 7. As soon as the pressure drops, the springs 39 will close the valves 35 and maintain them on their seats. The end ring member 43 adjacent to ring member 30 is provided with a single passage 45 through which fluid flows directly to the valve 35.

In order to hold the rings on the ribs 21 the lower ring member 43 has a shoulder 47 which rests on a portion of the compressor. Some method of holding the various ring members in position on the ribs 21, which they slidably engage, and to hold the assembled valve in position on the compressor, must be furnished and to that end a plate 49, resting on the compressor is placed above the valve assembly. A set screw or bolt 51 having a head 52 and an appropriate lock nut 53 is threaded into the plate 49 and rests directly on the central post 17 of the valve body. The bolt 51 can be made to bear on the post 17 with any degree of pressure which is desired and is locked in position by nut 53 to thus hold the valve assembly securely on the compressor.

It is a comparatively simple matter to assemble or dismantle the valve. In assembling the valve the valve body 11 is placed so that it rests with wall portion 15 uppermost. As has been indicated, the cross member 26 forms, with the reversed portion of the valve body wall, open passages 28 which form ports opening to the exterior of the valve, and lead to the discharge port of the compressor. Similarly to the other ports, a valve must be provided to open and close these ports and therefore the next step in the assembly is to put a ring valve 35 over these ports. Thereafter a ring member 23 is placed on the ring valve 35 and, since a series of springs 39 are provided around the circumference of the ring member 23, the valve 35 will bear against the springs and be resiliently held against its seats. Thereafter, valves plates 35 (also resting on springs 39) are placed on the opposite ports of passages 33 in the ring member 29 and the whole is placed in position on ring member 23. The ring member 30 having valve guide means 27 is then placed over the member 29 and valves 35 and the process is repeated until the valve assembly becomes of the desired height. In the drawing shown, the valve assembly consists of ring members 23, 29, 30 and 43 but it is apparent that by introducing alternately ring members of the same design as ring members 23 and 29 any number of valve ports may be provided. The final ring member placed in the valve assembly will always be ring member 43 which is adapted to bear on the compressor over its discharge port. When the assembly is complete it need only be placed in position and secured there by the plate 49 and the set screw or bolt 51. Obviously, if a greater number of valve ports are desired than the number illustrated in the drawing, it is only necessary to provide a longer valve body 11.

The dismantling of the assembly is just the reverse of the assembly procedure and accordingly needs no explanation.

With regard to Fig. 3 which shows a valve assembly adapted for use as an intake valve for the intake port of a compressor made in accordance with the principles of this invention, it will be noted that the ring or port members 55, corresponding to ring member 29 in Fig. 1, are open to atmosphere and communicate through the T-passage 57 with the interior of the compressor when the ring valves 35 are raised from their seats 61. The appropriate guide ring member 63, corresponding to ring member 23 of Fig. 1, is placed between each port member 57 in order to provide guide means 27 for the valves when raised off their seats.

The member 63 varies somewhat from member 23 in the arrangement of its ports in order that fluid flowing between valves 35 and seats 61 will be led to the compressor instead of to a discharge conduit. A second ring member 55 abuts against the member 63 and provides additional valve ports which are in turn controlled by valves 35.

In order to complete the valve assembly a final ring member 65 is provided which serves as a valve guide means for the valve 35 located on the lower port 61 of the second ring member 55. This member 65 has an appropriate passage 67 leading to the intake port of the compressor. This member also serves the same as the member 43 of Fig. 1 in that it rests against the compressor wall. The intake valve assembly is likewise held in place in a manner similar to the discharge valve assembly of Fig. 1 and thus easy access thereto is assured.

A key snap ring 69 is employed on both valve assemblies to hold the valve assembly together as a unit while it is being placed in or removed from the compressor.

The method of assembly of the intake valve will not be described as it is substantially the same as the method described in connection with the discharge valve of Fig. 1.

The operation of the valve as an intake member will be readily apparent when it is realized that, as the piston moves toward the left, the pressure of the fluid in the cylinder will be reduced until the pressure of the atmosphere is sufficient to overcome the compression of the springs 39 which maintain the valves 35 on their seats. When this occurs, the air will enter through the passages 57, flow past the seats 61 and into the passage 59 formed between the valve body and the various ring members 55 and 63. When the piston reverses and begins moving toward the right, the pressure immediately begins to increase with the result that the combined action of the springs 39 and the fluid pressure will force the valves 35 to rest on their respective seats.

Assuming that the valve assembly of Fig. 1 is being employed at the discharge port of the compressor, at such a time this valve assembly will begin to function. As the piston 2 moves toward the right, the pressure increases and when it is sufficient to force the valves 35 from their seats 37 against the compression of the springs 39, fluid may then flow from the port 3, through the passages 31 and 33, past the valve seats and to the conduit 7. Upon reaching the end of its stroke the piston will again move to the left thereby reducing the pressure and, consequently, permitting the springs 39 and the fluid pressure existing in the conduit 7 to close the valves.

The reason the valve body is formed within the valves 35 is to fill the space within the valve in order to reduce the clearance space of the compressor cylinder. Since, as the space in the valve is decreased the velocity of the fluid therethrough is increased, the amount that the clearance space can be reduced is limited by the predetermined maximum velocity which is permissible through the cylinder ports and the ports controlled by valves 35.

As has been pointed out, the portions 13 and 15 of the valve body are of different diameters. This expedient is resorted to in order that the clearance space may be reduced as much as possible where the velocity of the fluid will not be increased to the predetermined maximum velocity. With the arrangement shown in Fig. 1, for instance, there is no necessity for a large space or passage between the wall portion 13 and the ring member 23. The fluid which flows through this passage from the cylinder port 3 will be very much less than the amount passing through the port 3 because of the fact that the ports in members 29 and 43 will have permitted the escape of a large amount of the fluid. Likewise, in Fig. 3 fluid entering through the upper member 55 will be augmented by fluid entering through the lower member 55 and, consequently, the passage 59 must widen as it nears the compressor in order to retain a uniform velocity through the valve.

It will be readily apparent that the present invention may be readily modified in form by those skilled in the art without departure from the principles set forth and accordingly the invention is not to be limited save as defined in the appended claims.

I claim:

1. In a valve assembly for a fluid compressor, a valve body, ribs extending from the valve body, a removable ring member supported by the ribs and encircling the valve body, a T-shaped conduit in said ring member providing alined valve ports at the ends of the cross of the T, annular valves for the ports, and removable annular members supported by the ribs and surrounding the valve body to provide guides for the valves.

2. In a valve for a fluid compressor having a cylindrical body, ribs extending from the valve body, a valve ring member supported by the ribs having upper and lower faces, valve ports on the upper and lower faces, valve seats surrounding the ports, a T-shaped conduit provided in the valve ring to provide a passage from a port on the upper face and a port on the lower face to the space defined by the valve body and the valve ring member, an annular member for each face of the valve ring member supported by the ribs, annular valves for the ports, guide members on the annular member for each valve, and springs recessed in the annular members to normally maintain the valves on the valve seats.

3. In a valve assembly for a fluid compressor, a valve body having a central post and a cylindrical wall with portions of different diameter, ribs extending from said post and extending beyond said wall, a ring member supported by said ribs, valve ports on both sides of the ring member, a T-shaped conduit defined by the ring member to provide a passage from the ports to the space between the cylindrical wall and the ring member, annular valves for the ports, an annular member, guides mounted on the annular member for each annular valve, and springs mounted on the annular member to normally maintain the valves over the ports in the closed position.

4. In a valve assembly for a fluid compressor, a valve body, a removable guide member having valve guides mounted on the body, a removable port member mounted on said valve body and having valve ports on opposite sides thereof the ports on one side lying adjacent said valve guides, the ports on the other side being in alignment with the respective ports on the opposite side, a second removable guide member adjacent the ports on the opposite side of the removable port member, a second removable port member having ports on one side thereon adjacent said second guide member, and valves resiliently mounted and adapted to seat on said port members.

LLOYD N. ROBINSON.